(12) United States Patent
Kapoor et al.

(10) Patent No.: US 10,982,743 B2
(45) Date of Patent: Apr. 20, 2021

(54) ROTARY ELECTROHYDRAULIC ACTUATOR

(71) Applicant: Robert Bosch GmbH, Stuttgart (DE)

(72) Inventors: Manik Kapoor, Houston, TX (US); Royce Gerngross, Houston, TX (US)

(73) Assignees: Bosch Rexroth Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/331,492

(22) PCT Filed: Sep. 1, 2017

(86) PCT No.: PCT/EP2017/071952
§ 371 (c)(1),
(2) Date: Mar. 7, 2019

(87) PCT Pub. No.: WO2018/050452
PCT Pub. Date: Mar. 22, 2018

(65) Prior Publication Data
US 2019/0195020 A1 Jun. 27, 2019

Related U.S. Application Data

(60) Provisional application No. 62/395,484, filed on Sep. 16, 2016.

(51) Int. Cl.
*F16H 39/42* (2006.01)
(52) U.S. Cl.
CPC .................................. *F16H 39/42* (2013.01)

(58) Field of Classification Search
CPC .... F01B 13/061; F01B 13/063; F03C 1/0474; F03C 1/047; F16H 39/42
See application file for complete search history.

(56) References Cited

U.S. PATENT DOCUMENTS

| 2,709,071 A | 5/1955 | Hild |
| 2,762,339 A | 9/1956 | Schroeder |
| 2,891,771 A | 6/1959 | Ashton |

(Continued)

FOREIGN PATENT DOCUMENTS

| CN | 201598974 | 10/2010 |
| CN | 20378389 | 8/2014 |

(Continued)

OTHER PUBLICATIONS

PCT International Search Report for PCT/EP2017/071952.

*Primary Examiner* — F Daniel Lopez
(74) *Attorney, Agent, or Firm* — Kelly McGlashen; Maginot, Moore & Beck LLP

(57) ABSTRACT

A rotary electrohydraulic actuator includes a direct drive hydraulic motor having an output shaft through opening that is concentric with a rotational axis of a rotor of the hydraulic motor. The actuator includes a power plant mounted on the hydraulic motor via a manifold. The power plant includes an electric motor driven hydraulic pump. Operation of the electric motor causes the hydraulic pump to supply pressurized fluid to the hydraulic motor. The power plant is compactly mounted to the manifold so that a longitudinal axis of the electric motor is parallel to and spaced apart from the rotational axis of the hydraulic motor.

17 Claims, 7 Drawing Sheets

(56) References Cited

U.S. PATENT DOCUMENTS

| | | | |
|---|---|---|---|
| 3,448,627 A | | 6/1969 | Brooks |
| 3,979,295 A | | 9/1976 | Markley |
| 3,986,564 A | | 10/1976 | Bender |
| 4,242,057 A | | 12/1980 | Bender |
| 4,813,943 A | | 3/1989 | Shaw et al. |
| 5,176,364 A | | 1/1993 | Bell |
| 5,622,052 A | * | 4/1997 | F ahnle ................. F01B 13/063 |
| | | | 60/487 |
| 5,979,295 A | | 11/1999 | Larker et al. |
| 6,024,181 A | | 2/2000 | Richardson et al. |
| 6,913,096 B1 | | 7/2005 | Nielsen et al. |
| 7,261,277 B2 | * | 8/2007 | Copeman ................. B66D 1/42 |
| | | | 254/323 |
| 8,567,529 B2 | | 10/2013 | Williams |
| 8,839,884 B2 | | 9/2014 | Kuttle et al. |
| 9,528,332 B2 | | 12/2016 | Richardson |
| 2005/0269072 A1 | | 12/2005 | Folk et al. |
| 2011/0214919 A1 | | 9/2011 | McClung, III |
| 2013/0078114 A1 | * | 3/2013 | Van Rijswick ....... F04B 49/007 |
| | | | 417/53 |
| 2013/0180237 A1 | * | 7/2013 | Recoura .................. F04B 1/047 |
| | | | 60/484 |
| 2015/0027782 A1 | | 1/2015 | Weir et al. |

FOREIGN PATENT DOCUMENTS

| | | |
|---|---|---|
| DE | 102014200191 | 7/2015 |
| EP | 2770218 | 8/2014 |
| RU | 95106957 | 2/1997 |

\* cited by examiner

ROTARY ELECTROHYDRAULIC ACTUATOR

CROSS-REFERENCE TO RELATED APPLICATIONS

This application is a 35 U.S.C. § 371 National Stage Application of PCT/EP2017/071952, filed on Sep. 1, 2017, which claims the benefit of U.S. Provisional Application No. 62/395,484, filed on Sep. 16, 2016, the disclosures of which are herein incorporated by reference in their entirety.

BACKGROUND

1. Field of the Invention

This disclosure is directed to rotary electrohydraulic actuators such as, but not limited to, the type employed in top drives or power swivels for wellbore operations.

2. Description of the Related Art

A rotary electrohydraulic actuator is a device that uses a relatively small electrical motor to control the relatively large amount of power available from a hydraulic motor, and provides the power via a rotational output. Rotary electrohydraulic actuators are used in many applications in a wide variety of industries. For example, top drives are mechanical devices that are frequently used for drilling in the oil and gas industries. A top drive may be mounted in the drilling mast of a drilling rig and is typically raised lowered in the mast by a draw works mechanism. A top drive often comprises powerful electrical or hydraulic actuators and provides the motive force for a drilling tool that may hang from a traveling block. The actuators power a drive shaft to which crewmembers attach the drill string. In some top drives, the actuator is an electric motor. However, to generate the required power, the electric motor may be large and require a gear set in order to provide the required rotational speeds. Moreover, such electromechanical devices including gear sets may perform poorly in shock-loading situations often found in drilling applications. Other possible drawbacks to using an electric motor as an actuator in a top drive device may include an inability of some systems to provide a variable ratio from input to output, and difficulty accomplishing slipped movements or automatic overload protection. Other top drives employ hydraulic motors, which easily handle shock loads and may be characterized by having low inertia in the system that translates into better control. However, hydraulic motors are often associated with a power plant that is remote from the hydraulic motor, and thus require lengthy and sometimes large hoses to deliver hydraulic fluid from the power plant to the hydraulic motor. Such hoses add mass to the top drive and may be difficult to handle, require space around the top drive, and can experience leaks.

SUMMARY

In some aspects, a rotary electrohydraulic actuator includes a hydraulic motor including a hydraulic motor housing having a fluid inlet and a fluid outlet. The hydraulic motor includes a rotor disposed in the hydraulic motor housing so as to rotate about a rotational axis, the rotor including a through opening that is centered on the rotational axis and serves as a hollow output shaft of the hydraulic motor. The output shaft provides a gear-free connection to a driven shaft when a driven shaft is disposed in the through opening. The actuator includes a manifold that defines a fluid path between the fluid inlet and the fluid outlet, the manifold connected to the hydraulic motor housing in such a way as to permit the fluid path to communicate with the fluid inlet and the fluid outlet and the manifold to be spaced apart from the rotational axis. The actuator also includes a hydraulic pump disposed in the fluid path, and an electric motor that is configured to drive the hydraulic pump. Operation of the electric motor causes the hydraulic pump to supply pressurized fluid to one of the fluid inlet and fluid outlet of the hydraulic motor.

In some embodiments, the electric motor output shaft defines an electric motor longitudinal axis, and the electric motor is arranged so that the electric motor longitudinal axis is non-intersecting with the rotational axis.

In some embodiments, the electric motor output shaft defines an electric motor longitudinal axis, and the electric motor is arranged so that the electric motor longitudinal axis is parallel to, and spaced apart from, the rotational axis.

In some embodiments, the electric motor has a gear-free connection to the hydraulic pump.

In some embodiments, the manifold comprises a first manifold portion and a second manifold portion, and the first manifold portion is disposed on an opposed side of the hydraulic motor relative to the second manifold portion, and each of the first and second manifold portions is connected to a unique fluid inlet of the hydraulic motor and a unique fluid outlet of the hydraulic motor.

In some embodiments, the through opening extends through the hydraulic motor housing and opens on opposed sides of the hydraulic motor housing.

In some embodiments, the electric motor provides a dual shaft output, and the hydraulic pump comprises a first hydraulic pump disposed at one shaft of the dual shaft output, and a second hydraulic pump disposed at another shaft of the dual shaft output.

In some embodiments, the fluid path can be switched between a first configuration in which hydraulic motor operates at a first speed, and a second configuration in which the hydraulic motor operates at a second speed that is different than the first speed.

In some embodiments, the hydraulic motor comprises a first hydraulic motor, and a second hydraulic motor that is mounted in tandem with the first hydraulic motor.

In some embodiments, the actuator includes a power plant that includes the electric motor and the hydraulic pump, wherein the electric motor is a dual shaft electric motor, and the hydraulic pump comprises a first hydraulic pump and a second hydraulic pump. The first hydraulic pump is driven by a first shaft of the dual shaft electric motor, and the second hydraulic pump is driven by a second shaft of the dual shaft electric motor.

In some embodiments, the actuator includes at least two power plants, and each power plant is oriented so that the first shaft and the second shaft are non-intersecting with the rotational axis.

In some embodiments, each power plant is secured to the manifold such that each fluid inlet of each hydraulic pump and each fluid outlet of each hydraulic pump communicates with the fluid path, and the fluid path passes through each of the first hydraulic motor and the second hydraulic motor.

In some embodiments, the fluid path includes a series of interconnected fluid path branches that are configured to provide bi-directional and parallel hydraulic fluid flow into, and out of, each of the first hydraulic motor and the second hydraulic motor.

In some embodiments, the hydraulic motor is a straight axis motor.

In some aspects, a driving mechanism includes a rotary electrohydraulic actuator. The actuator includes a hydraulic motor including a hydraulic motor housing having a fluid inlet and a fluid outlet, and a rotor disposed in the hydraulic motor housing so as to rotate about a rotational axis. The rotor includes a through opening that is centered on the rotational axis and serves as a hollow output shaft of the hydraulic motor, whereby the output shaft provides a gear-free connection to a driven shaft when a driven shaft is disposed in the through opening. The actuator includes a manifold that defines a fluid path between the fluid inlet and the fluid outlet, the manifold connected to the hydraulic motor housing in such a way as to permit the fluid path to communicate with the fluid inlet and the fluid outlet and the manifold to be spaced apart from the rotational axis. The actuator includes a hydraulic pump disposed in the fluid path; and an electric motor that is configured to drive the hydraulic pump, wherein operation of the electric motor causes the hydraulic pump to supply pressurized fluid to one of the fluid inlet and fluid outlet of the hydraulic motor. The driving mechanism also includes an output shaft disposed in the output shaft opening; and a frame that supports the rotary electrohydraulic actuator relative to a support surface.

In some aspects, the output shaft is mechanically connected to a drill string, and the frame supports the rotary electrohydraulic actuator for movement along a frame longitudinal axis.

In some aspects, the output shaft is mechanically connected to a secondary pump that is configured to pump a slurry, and the frame supports the rotary electrohydraulic actuator in a fixed position relative to the secondary pump.

In some aspects, the driving mechanism includes a spool, wherein the spool has a cylindrical outer surface and a spool rotational axis centered within the cylindrical outer surface. In addition, the output shaft is mechanically connected to the spool in such a way that the output shaft drives the spool to rotate about the spool rotational axis, and the frame supports the spool and the rotary electrohydraulic actuator such that the spool rotates relative to the rotary electrohydraulic actuator.

The rotary electrohydraulic actuator includes a hydraulic motor that direct drives an output shaft, while maintaining a high power density. As used herein, the term "direct drive" refers to a configuration in which the motor has a gear free connection to the output or driven shaft. Since the hydraulic motor is a direct drive motor, gear systems between the motor and the output shaft are omitted, whereby the size of the actuator is reduced compared to some conventional actuators and costs and maintenance requirements are also reduced. Since the rotary electrohydraulic actuator described herein includes a hydraulic motor and is free of gears, the actuator is advantageous relative to some conventional electromechanical due to an ability to perform well in shock loading situations. It also permits a variable ratio from input to output, can easily accomplish slipped movements, and can provide automatic overload protection.

In addition, the power plant for the hydraulic motor is mounted on the hydraulic motor via a manifold, avoiding the need for fluid hoses. The power plant includes one or more compact electric motors that each drive at least one hydraulic pump. The pumps are disposed in the manifold, which supplies the drive fluid to the hydraulic motor.

In the power plant of the hydraulic motor, an electric motor is close-coupled to a pair of hydraulic pumps. As used herein, close-coupled refers to a configuration in which the pump impeller is mounted directly on the electric motor output shaft. Use of a close-coupled electric motor as the driver for the hydraulic pumps has the following advantages: There is a small, compact space requirement at the electric motor output shaft, and shock loading of the electric motor is negligible due to built-in dampening of the hydraulic fluid/conveyance medium.

Efficiency of the actuator is maximized due to elimination of long conveyance lines and valves. In some embodiments the electric motor is a small, compact permanent magnet electric motor that allows for speed control via a servo drive and reduces installation space of typical alternating current drive (ACD) system. The arrangement permits a reduction in hydraulic volume, and is environmentally friendly since it eliminates leak points.

In some embodiments, the electric motors and close-coupled hydraulic pumps are supported on the manifold so as to be arranged in parallel to, and spaced apart from, the rotational axis of the hydraulic motor. Since each electric motor and corresponding close-coupled hydraulic pump is spaced apart from the rotational axis of the hydraulic motor, the hydraulic motor provides a through hole mount that receives an output shaft therein. This arrangement is advantageous in top drive applications in which the output shaft extends through the hydraulic motor and provides an axial fluid path that is supplied at an upper end of the output shaft and discharged at a lower end. In addition, due to the elongated configuration of the electric motors and hydraulic pumps, the parallel arrangement relative to the rotational axis of the hydraulic motor provides a very compact or close-packed arrangement of the hydraulic motor power plant on the hydraulic motor, which is advantageous for use in top drive applications.

The rotary electrohydraulic actuator combines the advantages of a traditional hydraulic drive solution with the advantages of a typical electro-mechanical solution, and eliminates or mitigates the disadvantages of both conventional solutions. The rotary electrohydraulic actuator offers a significant advantage to any drive situation where shock loading and space are key limitations. In a loading situation where mechanical gearing is challenged, the rotary electrohydraulic actuator will significantly increase reliability.

DETAILED DESCRIPTION

Figure 1:
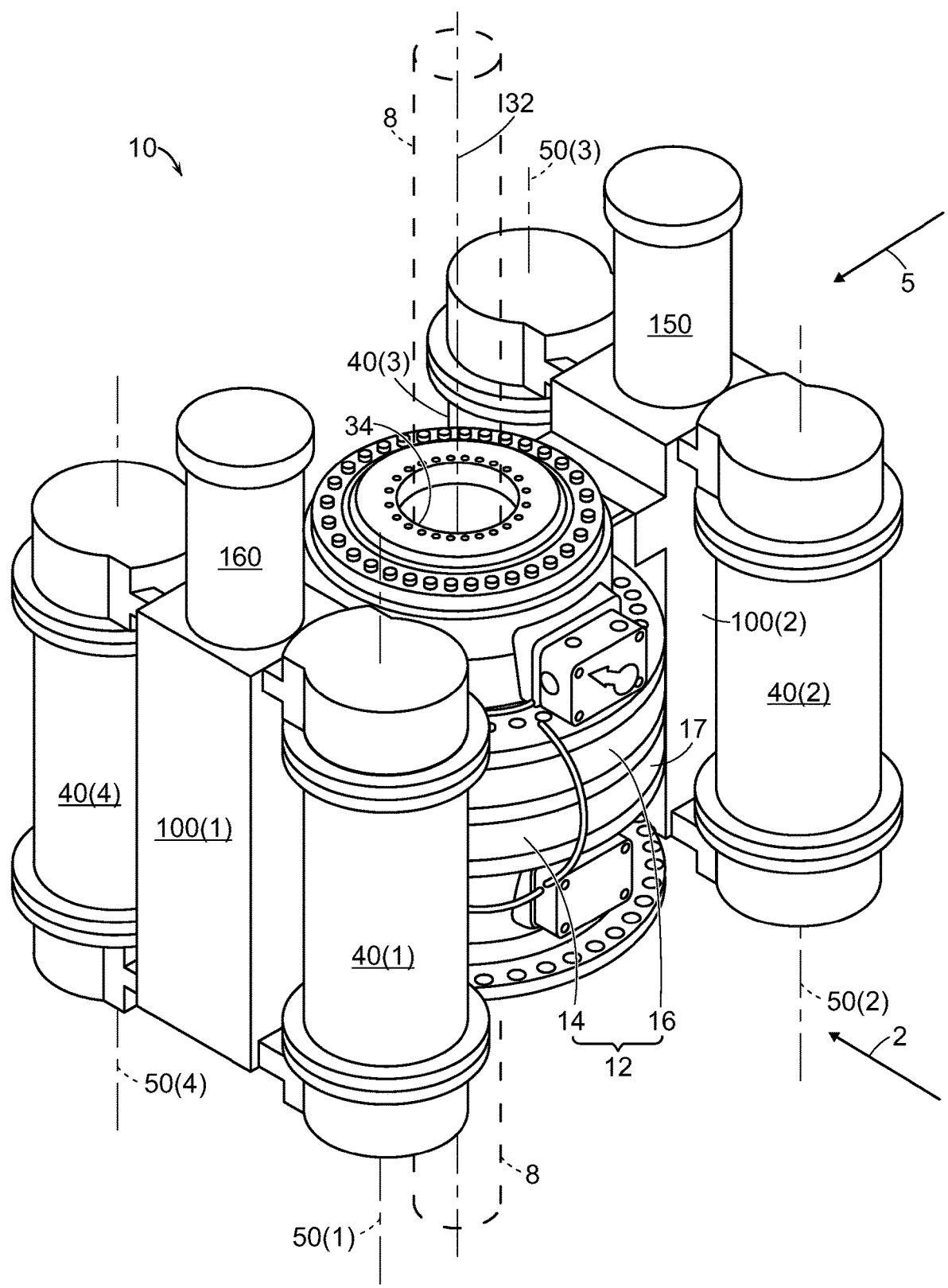
FIG. 1 is a perspective view of a rotary electrohydraulic actuator.
Figure 2:
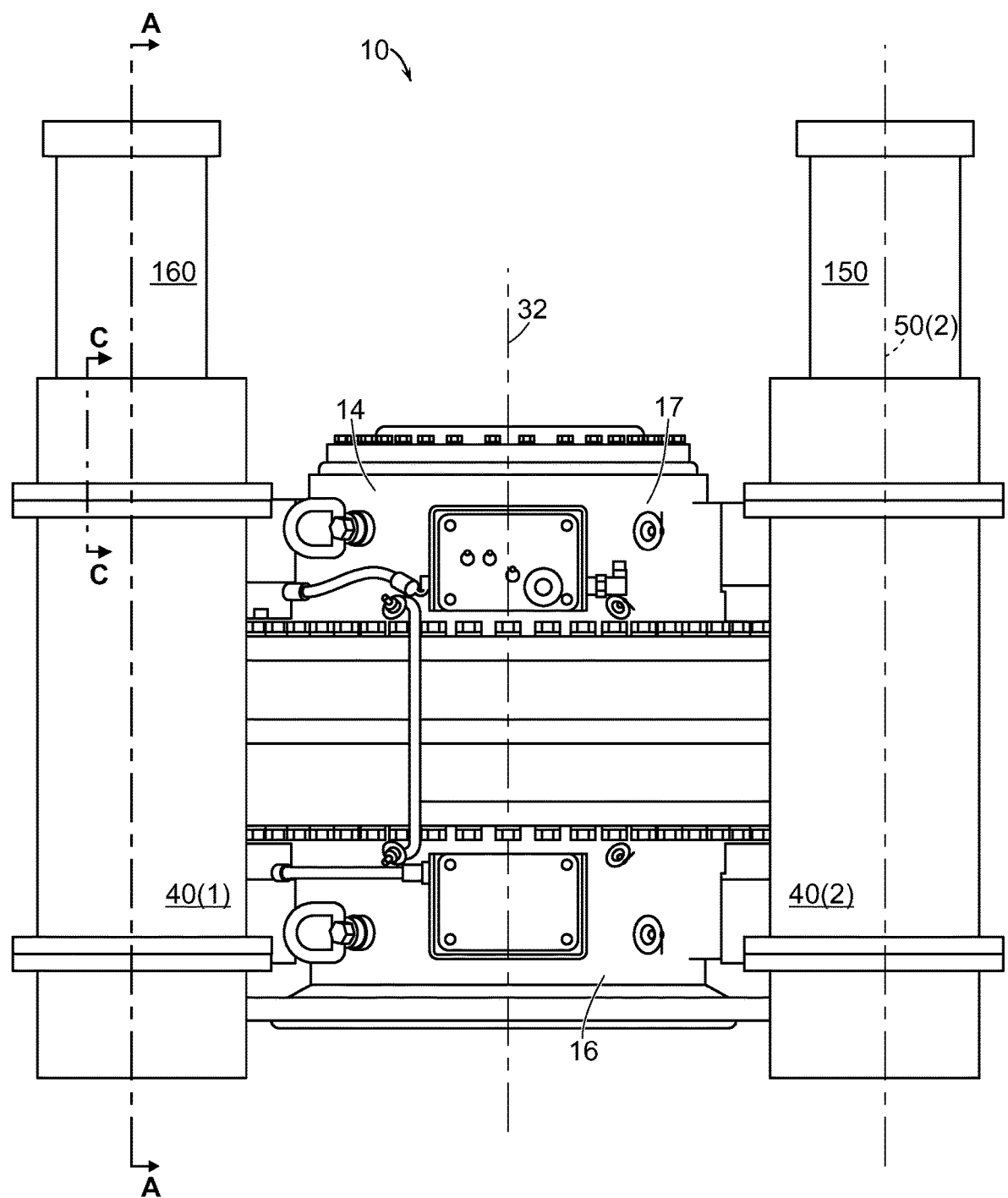
FIG. 2 is a side view of the rotary electrohydraulic actuator as seen in the direction of arrow 2 of FIG. 1.

Referring to FIG. 1, a rotary electrohydraulic actuator 10 includes a hydraulic motor unit 12, and at least one power plant 40 mounted on the hydraulic motor unit 12 via a manifold 100 that directs hydraulic fluid between the hydraulic motor unit 12 and the power plant 40. In the illustrated embodiment, two power plants 40(1), 40(4) are mounted on one side of the hydraulic motor unit 12 via a first manifold portion 100(1), and two additional power plants 40(2), 40(3) are mounted on an opposed side of the hydraulic motor unit 12 via a second manifold portion 100(2). The rotary electrohydraulic actuator 10 is a direct drive actuator, and is "self-contained" in that the power plants 40(1), 40(2), 40(3), 40(4) that supply hydraulic fluid to the hydraulic motor unit 12 are not remote, and are instead joined directly to the hydraulic motor unit 12. The rotary electrohydraulic actuator 10 provides a rotational output suitable for applications that require a driving range with low speed (less than 100 rpm) and high torque (100,000 ft-lbs to 150,000 ft-lbs or more), as well as high speed (200 rpm) and medium torque (4,000 ft-lbs to 50,000 ft-lbs), such as required by top drives or power swivels for drilling rigs or other rotary applications including mud pump actuators. It is understood, however, that the ranges described here are exemplary only, and that the rotary electrohydraulic actuator 10 can provide torque and speed combinations beyond those described above, and particularly can provide torque and speed combinations as required for a given application by appropriate scaling of components.

Figure 7:
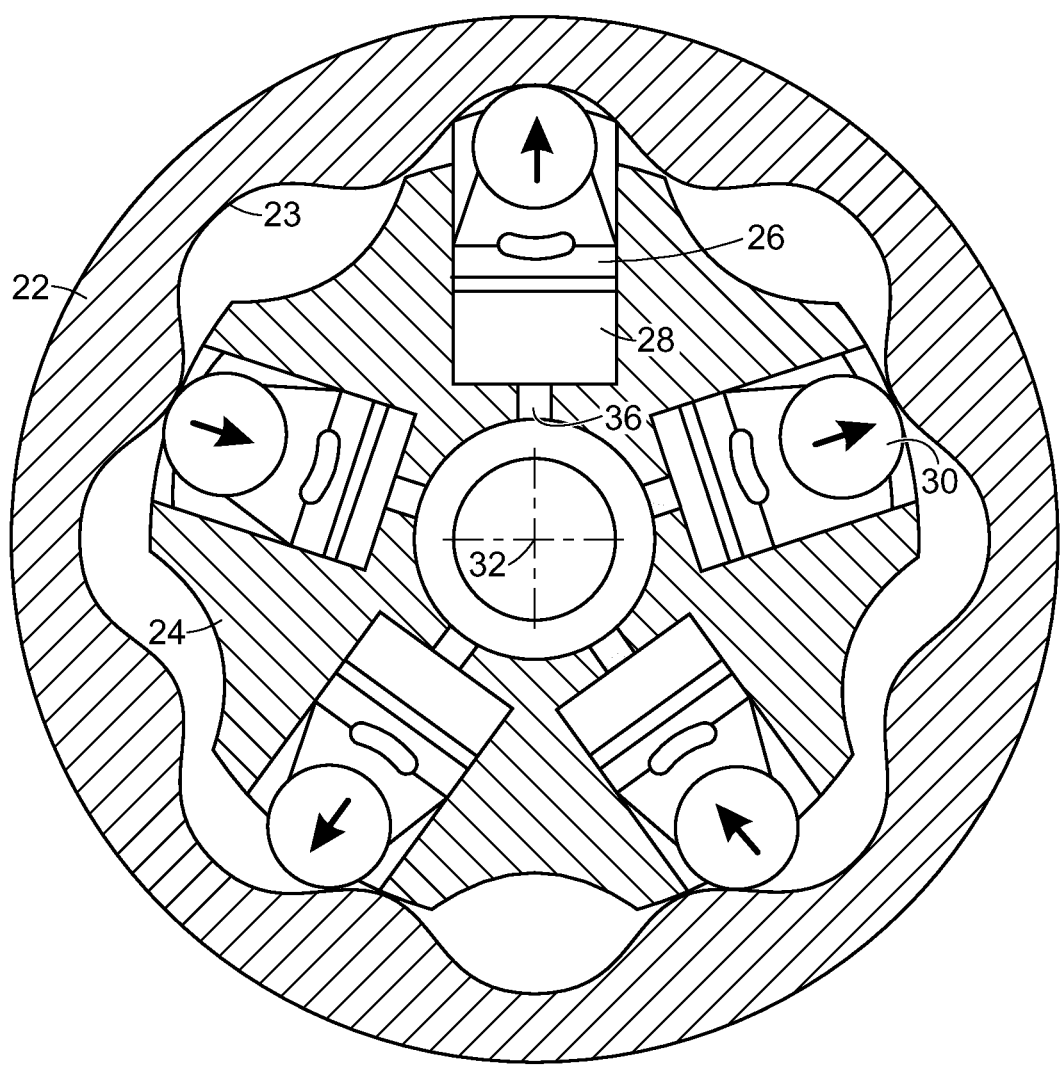
FIG. 7 is a cross-sectional view of a multi-lobe cam ring-type radial piston motor.

Referring to FIGS. 1 and 7, the hydraulic motor unit 12 is formed of a first hydraulic motor 14 and a second hydraulic motor 16 mounted in tandem. The first and second hydraulic motors 14, 16 are each a radial piston hydraulic motor. In the illustrated embodiment, first and second hydraulic motors 14, 16 are each a multi-lobe cam-ring type hydraulic motor that includes an outer cam ring 22 disposed in a housing 17 that defines a hydraulic fluid inlet 18 and hydraulic fluid outlet 20. The outer cam ring 22 has an undulated inner cam surface 23 that faces and surrounds the hydraulic motor rotational axis 32. The first and second hydraulic motors 14, 16 include a rotor in the form of an inner cylinder block 24. The cylinder block 24 is rotatable about the rotational axis 32 in relation to the cam ring 22 and has radially outwardly directed cylinders 28. A piston 26 is slideably disposed in each of the cylinders 28, and a cam roll 30 is associated with each piston 26. Each cam roll 30 is arranged against the corresponding piston 26, and rolls along and against the cam surface 23. The first and second hydraulic motors 14, 16 also include distributing valves (not shown) that distribute hydraulic fluid to the cylinders 28 via ducts 36 in a working stroke of the respective pistons 26 and evacuates the hydraulic fluid from the cylinders 28 in a return stroke of the respective pistons 26. Although the cylinder block 24 and cam ring 22 are illustrated as having five sets of pistons 26 and cam rolls 30, and a corresponding number of undulations in the outer cam ring 22, the hydraulic motors 14, 16 are not limited to this number. For example, in some hydraulic motors, the number of sets of pistons 26 and cam rolls 30, and the corresponding number of undulations in the outer cam ring 22 may be greater or fewer, and is determined by the requirements of the application. In some hydraulic motors, multiple outer cam rings 22 are provided, each having sets of pistons 26 and cam rolls 30, and the number of cam rings 22 is determined by the requirements of the application.

Each of the first and second hydraulic motors 14, 16 has a central through-opening 34 that is formed in the cylinder block 24 so as to be concentric with the hydraulic motor unit rotational axis 32. The central openings 34 extend continuously through the respective first and second hydraulic motors 14, 16, and serve as a hollow output shaft of the hydraulic motor unit 12. The central openings 34 are configured to receive a driven shaft 8 (shown in broken lines in FIG. 1) of an external driven device (not shown), and engage the driven shaft 8 via, for example, a spline connection or other appropriate mechanism. The through-openings 34 open on opposed sides of the hydraulic motor unit 12. This configuration allows the driven shaft 8 to extend through the hydraulic motor unit 12 such that opposed ends of the driven shaft 8 are accessible. In other embodiments, in order to accommodate applications that require a male connection to an external driven device, a stub shaft (not shown) may optionally be provided within the central openings 34 and fixed to the cylinder block 24.

Referring to FIGS. 2-6, the rotary electrohydraulic actuator 10 includes four power plants 40(1), 40(2), 40(3), 40(4). Each power plant 40(1), 40(2), 40(3), 40(4) is identical, so only one power plant 40(1), hereafter referred to as power plant 40, will be described. The power plant 40 includes an electric motor 42, and a hydraulic pump 60 disposed at each end of the electric motor 42. For example, the first power plant 40(1) includes an alpha hydraulic pump 60(1)a at one end of the electric motor 42, and a beta hydraulic pump 60(1)b at the opposed end.

The electric motor 42 is a reversible, variable speed, permanent magnet motor having dual female shafts (e.g., dual hollow shafts) 48 arranged collinearly with a longitudinal axis 50 of the electric motor 42. The electric motor 42 includes a stator 46, a permanent magnet rotor 44 rotatably disposed within the stator 46 so as to rotate about the longitudinal axis 50. A female shaft 48 is provided at each end of the rotor 44. The female shafts 48 are configured to receive and engage an input shaft 72 of one hydraulic pump 60 of the pair of hydraulic pumps 60(a), 60(b), as discussed further below. The electric motor 42 is close-coupled to the hydraulic pumps 60(1)a, 60(1)b. As used herein, close-coupled refers to a configuration in which the pump input shaft 72 is mounted directly on or is formed integrally with the electric motor output shaft, and thus has a gear-free connection to the electric motor output shaft. Use of a close-coupled electric motor 42 as the driver for the hydraulic pumps 60 in combination with the dual female shafts 48 results in a small, compact electric motor unit that is advantageous in applications having small space requirements.

Figure 3:
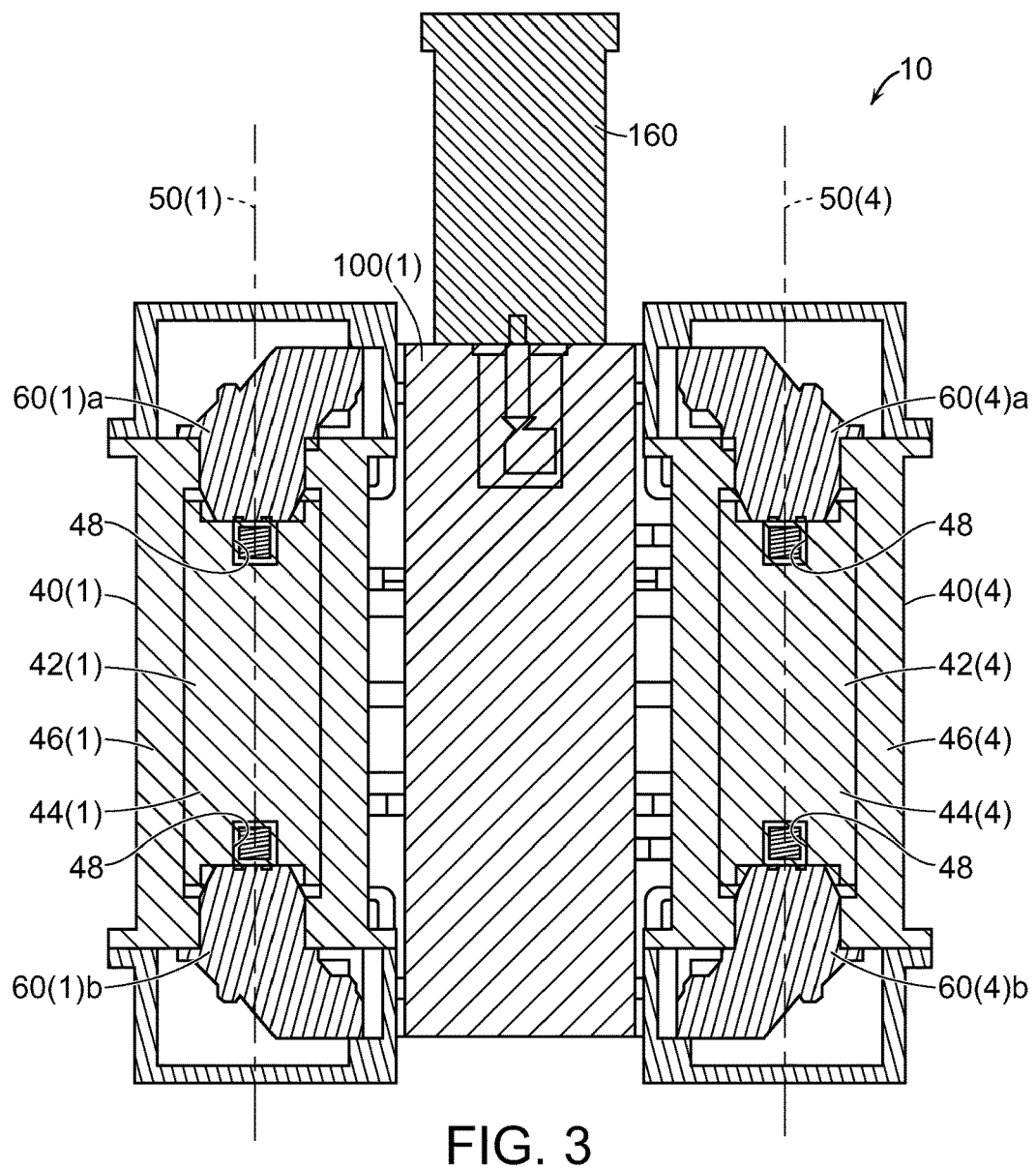
FIG. 3 is a cross-sectional view of the rotary electrohydraulic actuator as along line A-A of FIG. 2.
Figure 8:
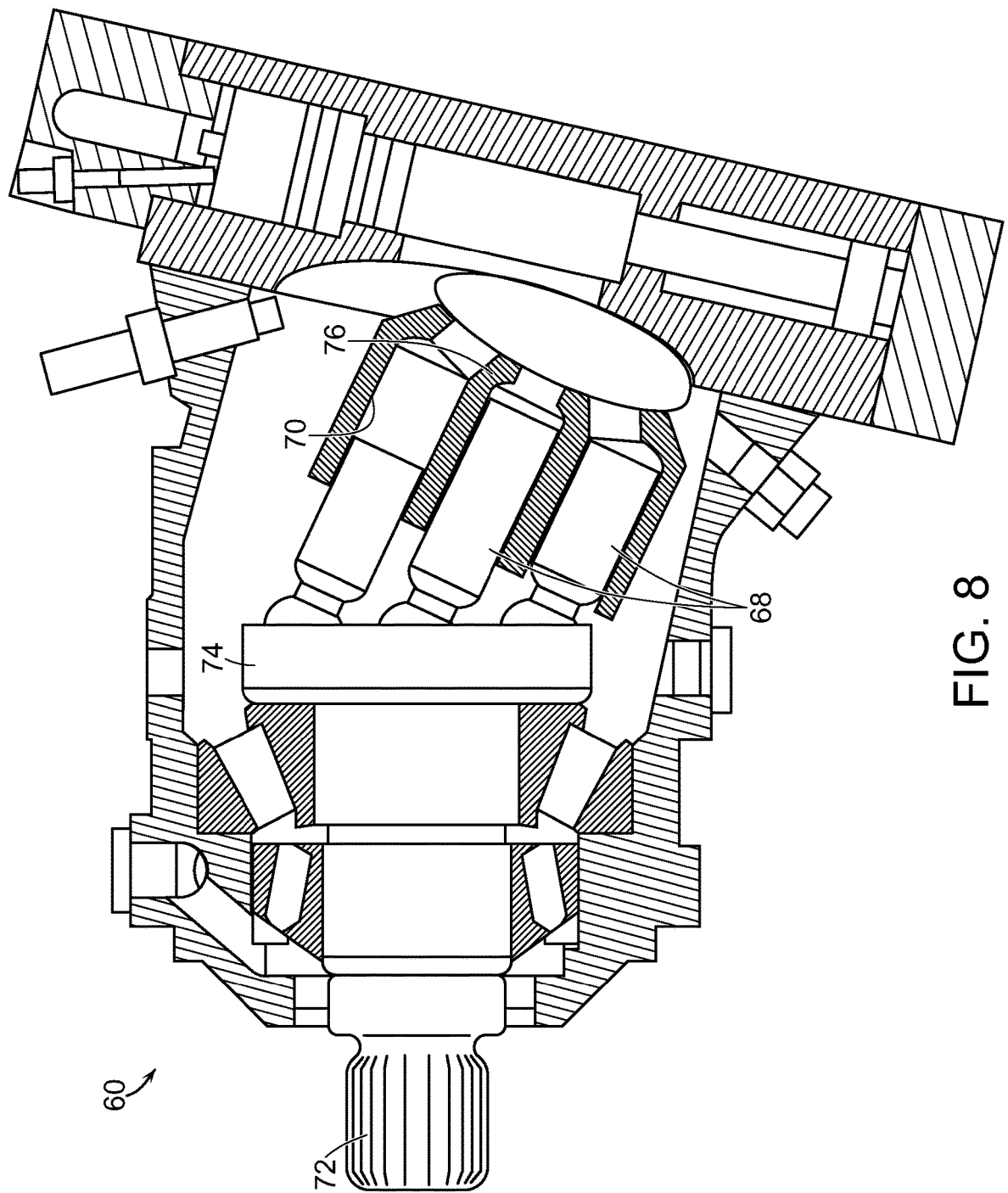
FIG. 8 is a cross-sectional view of a variable displacement plunger pump.

Referring to FIGS. 3 and 8, the alpha and beta hydraulic pumps 60(1)a, 60(1)b are identical, so only one hydraulic pump 60(1)a, hereafter referred to as hydraulic pump 60, will be described. The hydraulic pump 60 is a variable displacement bent axis piston hydraulic pump that includes a disc shaped drive plate 74, an input (e.g., driven) shaft 72 rigidly protruding from one side of the drive plate 74, and ball-tipped pistons 68 rotatably connected about a periphery of an opposed side of the drive plate 74. The ball tip on a proximal end of each piston 68 is received in a spherical socket on the opposed side of the drive plate 74, whereby the piston 68 is retained on the drive plate 74 but is able to rotate relative to the drive plate 74. A distal end of each piston 68 is slidably received within a corresponding cylinder 70 formed in a cylinder block 76. The amount of fluid displacement generated by the hydraulic pump 60 can be varied by varying the angle of the cylinder block 76 relative to the longitudinal axis of the input shaft 72.

The input shaft 72 may be connected to the female shaft 48 of the electric motor 42, for example via a spline connection or other appropriate mechanism. The electric motor 42 drives the input shaft 72 and drive plate 74 to rotate, whereby hydraulic fluid is distributed to the cylinders 70 in a working stroke of the respective pistons 68 when the piston is moved closer to the cylinder block 76 due to drive plate rotation and evacuates the hydraulic fluid from the cylinders 70 in a return stroke of the respective pistons 68 when the piston is moved away from the cylinder block 76 due to drive plate rotation.

Each of the four power plants 40(1), 40(2), 40(3), 40(4) are secured to the manifold 100 so that the longitudinal axes 50 of the electric motors are parallel to the hydraulic motor unit rotational axis 32. In addition, each of the four power plants 40(1), 40(2), 40(3), 40(4) are disposed adjacent to a circumferential surface of the hydraulic motor unit housing 17, whereby the longitudinal axes 50 of the electric motors are radially spaced apart from the hydraulic motor unit rotational axis 32. This arrangement of the four electric motors 42 and the hydraulic motor unit 12 is very compact, especially when compared to an arrangement in which the longitudinal axes 50 of the electric motors are transverse to the hydraulic motor unit rotational axis 32.

Figure 4:
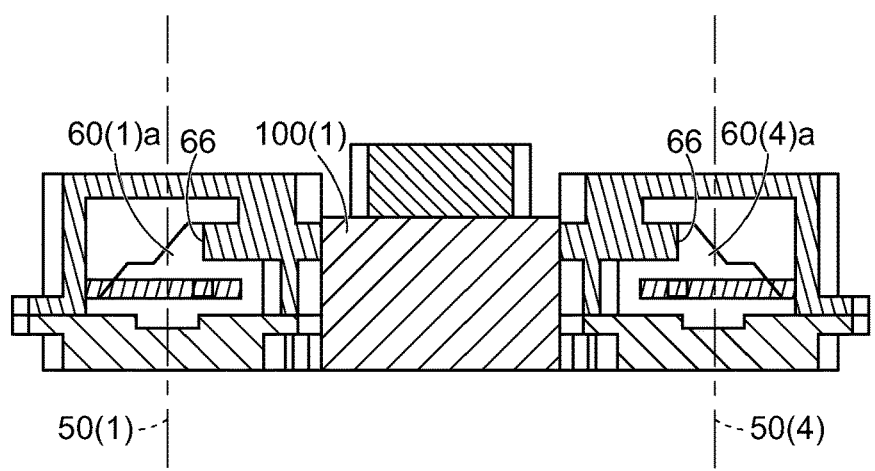
FIG. 4 is a cross-sectional view of the rotary electrohydraulic actuator as along line C-C of FIG. 2.
Figure 5:
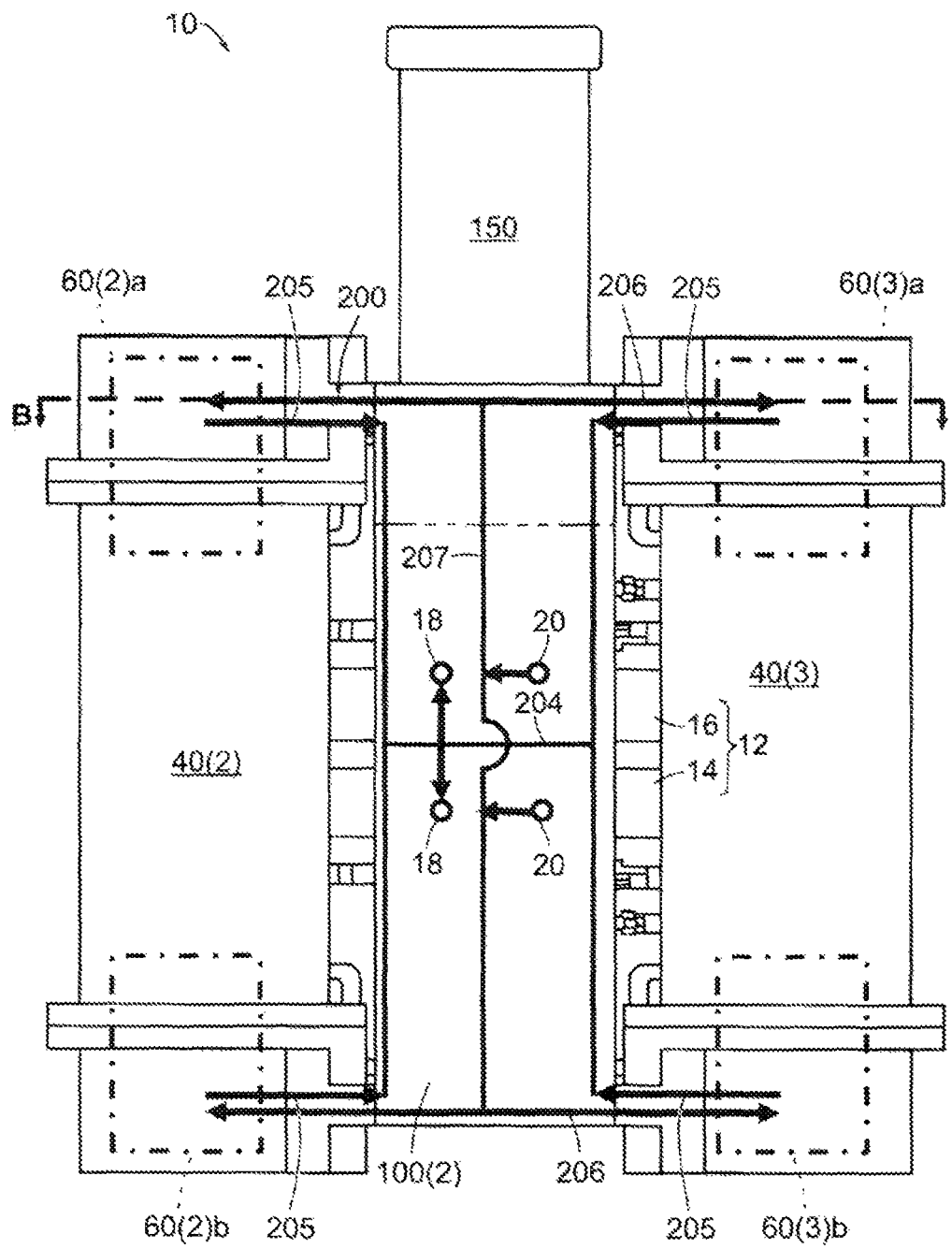
FIG. 5 is a side view of the rotary electrohydraulic actuator as seen in the direction of arrow 5 of FIG. 1.
Figure 6:
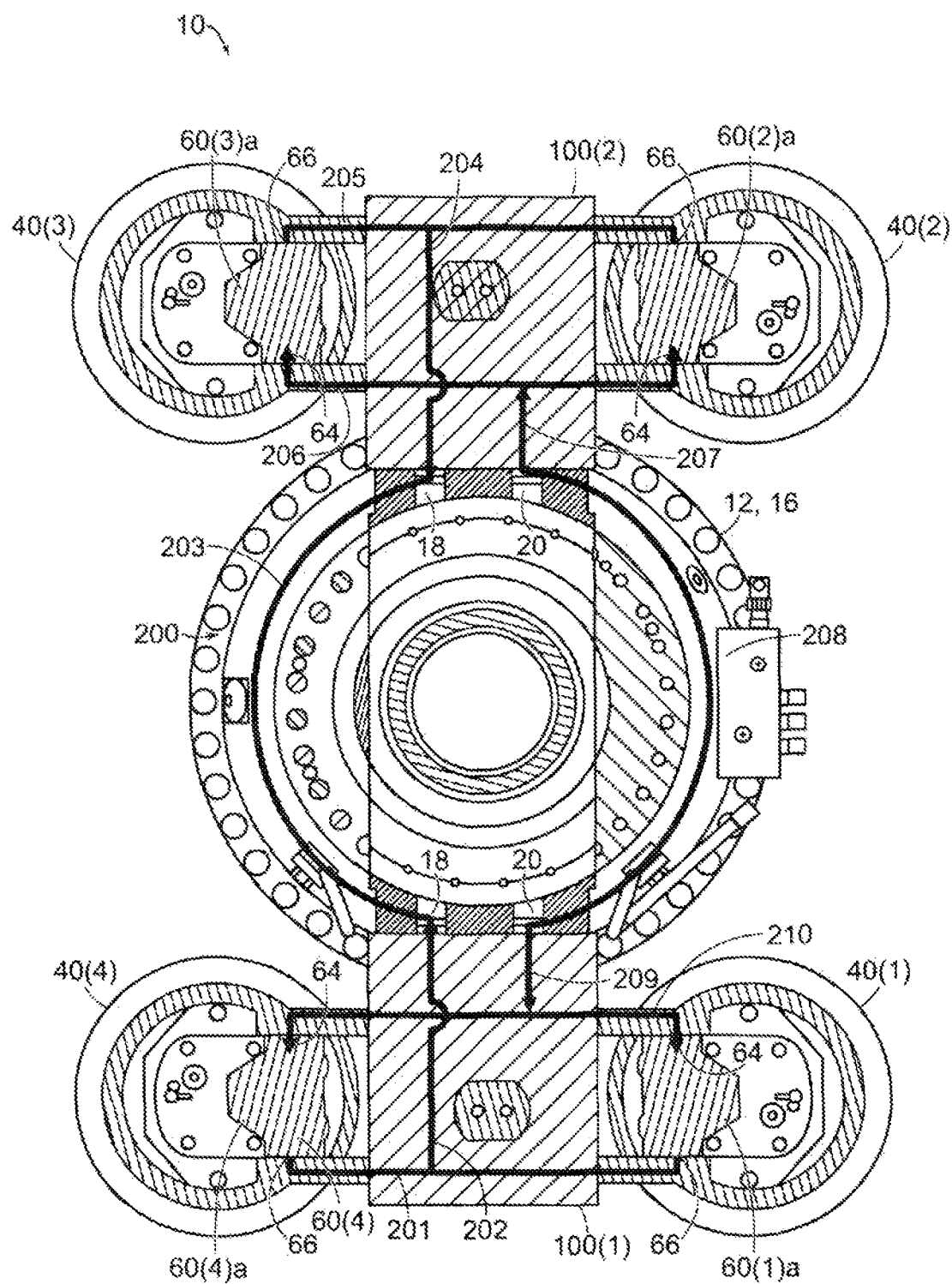
FIG. 6 is a cross-sectional view of the rotary electrohydraulic actuator as along line B-B of FIG. 5.

Referring to FIGS. 4-6, each of the four power plants 40(1), 40(2), 40(3), 40(4) are secured to the manifold 100 in such a way that hydraulic pump fluid inlets 64 and hydraulic pump fluid outlets 66 communicate with a hydraulic fluid path 200 that passes through each of the hydraulic pumps 60 and the first and second hydraulic motors 14, 16 of the hydraulic motor unit 12. The hydraulic fluid path 200 is at least partially housed in the manifolds 100(1), 100(2) and is a closed circuit used to direct hydraulic fluid pressurized in the hydraulic pumps 60 to the hydraulic motor unit 12, and return hydraulic fluid discharged from the hydraulic motor unit 12 to the hydraulic pumps 60.

The hydraulic fluid path 200 includes a series of interconnected fluid path branches configured to provide bi-directional and parallel hydraulic fluid flow into both sides, and out from both sides, of the hydraulic motor unit 12, as will now be described in detail: Hydraulic fluid circulates from the outlets 66 of the hydraulic pumps 60(1)a, 60(1)b, 60(4)a, 60(4)b of the first and fourth power plants 40(1), 40(4) through a first branch 201 of the hydraulic fluid path 200. The first branch 201 connects the outlets 66 of the alpha and beta pumps 60(1)a, 60(1)b of the first power plant 40(1) to the outlets 66 of the alpha and beta pumps 60(4)a, 60(4)b of the of the fourth power plant 40(4). In addition, the first branch 201 connects to a fluid path second branch 202 that directs hydraulic fluid to the inlets 18 of the first and second hydraulic motors 14, 16 located on the first side of the hydraulic motor unit 12. Pressurized hydraulic fluid enters the inlets 18 of the first and second hydraulic motors 14, 16 and performs work on the rotors 24 of the first and second hydraulic motors 14, 16 as is passes along a third branch 203 of the hydraulic fluid path 200.

In addition, hydraulic fluid circulates from the outlets 66 of the hydraulic pumps 60(2)a, 60(2)b, 60(3)a, 60(3)b of the second and third power plants 40(2), 40(3) through a fifth branch 205 of the hydraulic fluid path 200. The fifth branch 205 connects the outlets 66 of the alpha and beta pumps 60(2)a, 60(2)b of the second power plant 40(2) to the outlets 66 of the alpha and beta pumps 60(3)a, 60(3)b of the of the third power plant 40(3). In addition, the fifth branch 205 connects to a fluid path fourth branch 204 that directs hydraulic fluid to the inlets 18 of the first and second hydraulic motors 14, 16 located on the second side of the hydraulic motor unit 12. Pressurized hydraulic fluid enters the inlets 18 of the first and second hydraulic motors 14, 16 and performs work on the rotors 24 of the first and second hydraulic motors 14, 16 as is passes along the third branch 203 of the hydraulic fluid path 200.

Hydraulic fluid discharging from pistons 26 of the first and second hydraulic motors 14, 16 passes along an eighth branch 208 and then exits from outlets 20 on the first side of the hydraulic motor unit 12 and passes into a fluid path ninth branch 209. The ninth branch 209 communicates with a fluid path tenth branch 210. The tenth branch 210 connects the inlets 64 of the alpha and beta pumps 60(1)a, 60(1)b of the first power plant 40(1) to the inlets 64 of the alpha and beta pumps 60(4)a, 60(4)b of the of the fourth power plant 40(4).

In addition, hydraulic fluid discharging from pistons 26 of the first and second hydraulic motors 14, 16 passes along the eighth branch 208 and then exits from outlets 20 on the second side of the hydraulic motor unit 12 and passes into a fluid path seventh branch 207. The seventh branch 207 communicates with a fluid path sixth branch 206. The sixth branch 206 connects the inlets 64 of the alpha and beta pumps 60(2)a, 60(2)b of the second power plant 40(2) to the inlets 64 of the alpha and beta pumps 60(3)a, 60(3)b of the of the third power plant 40(3).

The first, second, ninth and tenth branches 201, 202, 209, 210 of the hydraulic fluid path 200 are formed in the first manifold portion 100(1). The second and ninth branches 202, 209 connect the first and fourth alpha hydraulic pumps 60(1)a, 60(4)a to the first and fourth beta hydraulic pumps 60(1)b, 60(4)b. Likewise, the fourth, fifth, sixth, and seventh branches 204, 205, 206, 207 of the hydraulic fluid path 200 are formed in the second manifold portion 100(2). As seen in FIG. 5, the fourth and seventh branches 204, 207 connect the second and third alpha hydraulic pumps 60(2)a, 60(3)a to the second and third beta hydraulic pumps 60(2)b, 60(3)b.

In some embodiments, the rotary electrohydraulic actuator 10 includes a charge pump 150 and and/or an auxiliary pump 160 mounted on the manifold 100 so as to communicate with the hydraulic fluid path 200. For example, the charge pump 150 may be used to maintain a minimum pressure on the back side of the pistons, and the auxiliary pump 160 may be used to circulate a coolant or drive ancillary components of the top drive. The rotary electrohydraulic actuator 10 may also include filters (not shown) disposed in the manifold 100 that are configured to remove particulates or other contaminants from the hydraulic fluid. In addition, the rotary electrohydraulic actuator 10 may include temperature sensors (not shown), pressure sensors (not shown) and/or other appropriate sensors (not shown) that facilitate monitoring and/or control of the operation of the rotary electrohydraulic actuator 10.

The rotary electrohydraulic actuator 10 including the hydraulic motor unit 12, and at least one power plant 40 mounted on the hydraulic motor unit 12 via the manifold 100 provides a very powerful and very compact actuator due at least in part to the use of a direct drive hydraulic motor unit 12, the proximate mounting of the power plant 40 on the hydraulic motor unit 12 whereby hoses and other elongate conduits are omitted, and mounting of the electric motors 42 within the power plant 40 so as to be parallel to, and spaced apart from, the rotational axis of the hydraulic motor unit 12.

The rotary electrohydraulic actuator 10 can be used in a wide variety of applications that require rotary actuation. Although not limited to any particular application, the rotary electrohydraulic actuator 10 has obvious advantages for use in drilling machines as part of a top drive or power swivel. For example, the rotary electrohydraulic actuator occupies a much smaller volume within a top drive than do some conventional top drive actuators. In some embodiments, the volume occupied by some conventional top drive actuators having electric motors and gears sets is about twice that of the rotary electrohydraulic actuator 10. In addition, the weight of the rotary electrohydraulic actuator 10 is much less than that of such conventional top drive actuators. The rotary electrohydraulic actuator 10 provides the performance benefits of a conventional hydraulic drive including shock load absorption and improved control while eliminating long conveyance lines and valves. In addition to being used in drilling machines, the rotary electrohydraulic actuator 10 may be used in other applications, including, but not limited to, power swivels, winch drives, thruster drives, rotary pump drives, hoist drives, etc.

Although the rotary electrohydraulic actuator 10 includes four power plants 40(1), 40(2), 40(3), 40(4), the rotary electrohydraulic actuator 10 is not limited to having four power plants 40, and may include a greater or fewer number of power plants 40 as required by the specific application. Moreover, the rotary electrohydraulic actuator 10 may be controlled to use a subset of the power plants 40 provided, depending upon power requirements at a given time.

In the illustrated embodiment, the manifold 100 is configured so that hydraulic fluid from all of the hydraulic pumps 60 is combined into a single hydraulic fluid path 200 that is used to supply both the first and second hydraulic motors 14, 16 of the hydraulic motor unit 12. In other embodiments, the manifold 100 is configured so that fluid from a first subset of pumps (for example, a subset including hydraulic pumps 60(1)a, 60(1)b, 60(4)a, 60(4)b of the first and fourth power plant 40(1), 40(4)) is combined into a first fluid path that is used to supply the first hydraulic motor 14, and fluid from a second subset of pumps (for example, a subset including hydraulic pumps 60(2)a, 60(2)b, 60(3)a, 60(3)b of the second and third power plant 40(2), 40(3)) is combined into a second fluid path that is used to supply the second hydraulic motor 16. In some embodiments, the manifold 100 may include valves that can redirect fluid from the second hydraulic motor 16 to the first hydraulic motor 14 (or vice versa), such that fluid from all pumps 60 flows to a single hydraulic motor, i.e., the first hydraulic motor 14, providing a higher speed, lower torque configuration. Thus, the rotary electrohydraulic actuator 10 can be configured as a gear free, two speed motor.

In the illustrated embodiment, the first and second manifolds 100(1), 100(2) are external to and supported on the hydraulic motors 14, 16. However, it is understood that the first and second manifolds 100(1), 100(2) can be integrated into the housings of the hydraulic motors 14, 16.

In some embodiments, the hydraulic fluid used in the manifold 100 is biodegradable. In some embodiments, the hydraulic fluid also serves as a coolant for the hydraulic motors 14, 16, the hydraulic pumps 60 and the electric motors 42.

In the illustrated embodiment, the electric motor 42 used in each power plant 40 is a reversible, variable speed, permanent magnet motor having dual female shafts (e.g., dual hollow shafts) 48. However, the electric motor 42 is not limited to this type of motor and any appropriate motor can be used including those that are non-reversible and/or constant speed. Moreover, the type of electric motor used in one or more power plants (i.e., power plants 40(1), 40(3)) may be different than the type of electric motor used in the remaining power plants (i.e., power plants 40(2). 40(4)).

In the illustrated embodiment, the alpha and beta hydraulic pumps 60(1)a, 60(1)b used in each power plant 40(1) are variable displacement bent axis piston hydraulic pumps. However, the alpha and beta hydraulic pumps 60(1)a, 60(1)b are not limited to this type of pump and any appropriate pump can be used including those that are straight axis, fixed displacement and/or of gear, rotary vane, screw, radial piston or other type. Moreover, the type of hydraulic pump used as the alpha hydraulic pump 60(1)a may be different than the type of hydraulic pump used as the beta hydraulic pump 60(1)b. In addition, or alternatively, the types of pumps used in one or more power plants (i.e., power plants 40(1), 40(3)) may be different than the types of pumps used in the remaining power plants (i.e., power plants 40(2). 40(4)).

In the illustrated embodiment, the hydraulic motors 14, 16 are each a straight axis radial piston hydraulic motor. However, in some embodiments, one or both of the hydraulic motors 14, 16 may have a bent axis.

Selective illustrative embodiments of the rotary electrohydraulic actuator are described above in some detail. It should be understood that only structures considered necessary for clarifying this device has been described herein. Other conventional structures, and those of ancillary and auxiliary components of the actuator system, are assumed to be known and understood by those skilled in the art. Moreover, while working examples of the rotary electrohydraulic actuator has been described above, the rotary electrohydraulic actuator is not limited to the working examples described above, but various design alterations may be carried out without departing from the devices as set forth in the claims.

What is claimed is:

1. A rotary electrohydraulic actuator comprising
a hydraulic motor including a hydraulic motor housing having a fluid inlet and a fluid outlet, and a hollow rotor disposed in the hydraulic motor housing so as to rotate about a rotational axis, the rotor including a through opening that is centered on the rotational axis, whereby the rotor provides a gear-free connection to a driven shaft when the driven shaft is disposed in the through opening,
a manifold that defines a portion of a fluid path through the rotary electrohydraulic actuator, the portion extending between the fluid inlet and the fluid outlet, the manifold connected to the hydraulic motor housing in such a way as to permit the fluid path to communicate with the fluid inlet and the fluid outlet and the manifold to be spaced apart from the rotational axis; and
a power plant mounted on the hydraulic motor via the manifold, the power plant supported on the manifold via a hose-free connection, the power plant including:
a hydraulic pump disposed in the fluid path; and
an electric motor that is configured to drive the hydraulic pump,
wherein operation of the electric motor causes the hydraulic pump to supply pressurized fluid to one of the fluid inlet and fluid outlet of the hydraulic motor.

2. The rotary electrohydraulic actuator of claim 1, wherein an output shaft of the electric motor defines an electric motor longitudinal axis, and the electric motor is arranged so that the electric motor longitudinal axis is non-intersecting with the rotational axis.

3. The rotary electrohydraulic actuator of claim 1, wherein an output shaft of the electric motor defines an electric motor longitudinal axis, and the electric motor is arranged so that the electric motor longitudinal axis is parallel to, and spaced apart from, the rotational axis.

4. The rotary electrohydraulic actuator of claim 1, wherein the electric motor has a gear-free connection to the hydraulic pump.

5. The rotary electrohydraulic actuator of claim 1, wherein the fluid inlet includes a first fluid inlet on a first side of the hydraulic motor and a second fluid inlet on a second side of the hydraulic motor, the manifold comprises a first manifold portion and a second manifold portion, the first manifold portion is disposed on the first side of the hydraulic motor, the second manifold portion is disposed on the second side of the hydraulic motor, the first manifold portion is connected to the first fluid inlet of the hydraulic motor, the second manifold portion is connected to the second fluid inlet of the hydraulic motor, and the second side is opposed to the first side.

6. The rotary electrohydraulic actuator of claim 1, wherein the through opening extends through the hydraulic motor and opens on opposed sides of the hydraulic motor housing.

7. The rotary electrohydraulic actuator of claim 1, wherein the electric motor includes a rotor having a rotor first end and rotor second end that is opposed to the rotor first end, and the hydraulic pump comprises a first hydraulic pump connected to, and driven by, the rotor first end, and a second hydraulic pump connected to, and driven by the rotor second end.

8. The rotary electrohydraulic actuator of claim 7, wherein
the rotor first end is female, and an input shaft of the first hydraulic pump is received in, and engages with, the rotor first end, and
the rotor second end is female, and an input shaft of the second hydraulic pump is received in, and engages with, the rotor second end.

9. The rotary electrohydraulic actuator of claim 1, wherein the fluid path can be switched between a first configuration in which hydraulic motor operates at a first speed, and a second configuration in which the hydraulic motor operates at a second speed that is different than the first speed.

10. The rotary electrohydraulic actuator of claim 1, wherein the hydraulic motor comprises
a first hydraulic motor, and
a second hydraulic motor that is mounted in tandem with the first hydraulic motor.

11. The rotary electrohydraulic actuator of claim 10, wherein
the electric motor includes a rotor having a rotor first female end and rotor second female end that is opposed to the rotor first female end, and
the hydraulic pump comprises a first hydraulic pump and a second hydraulic pump, and the first hydraulic pump is driven by the rotor first female end, and the second hydraulic pump is driven by the rotor second female end.

12. The rotary electrohydraulic actuator of claim 11, wherein
the rotor first female end and the rotor second female end are arranged co-linearly with a longitudinal axis of the electric motor, and
the power plant comprises at least two power plants, and each power plant is oriented so that the longitudinal axes of the electric motors of the respective at least two power plants are non-intersecting with the rotational axis.

13. The rotary electrohydraulic actuator of claim 12, wherein each power plant is secured to the manifold such that each fluid inlet of each hydraulic pump and each fluid outlet of each hydraulic pump communicates with the fluid path, and the fluid path passes through each of the first hydraulic motor and the second hydraulic motor.

14. The rotary electrohydraulic actuator of claim 13, wherein the fluid path includes a series of interconnected fluid path branches that are configured to provide bi-directional and parallel hydraulic fluid flow into, and out of, each of the first hydraulic motor and the second hydraulic motor.

15. The rotary electrohydraulic actuator of claim 1, wherein the hydraulic motor is a straight axis motor.

16. A rotary electrohydraulic actuator comprising:
a hydraulic motor including a hydraulic motor housing having a first fluid inlet, a second fluid inlet, a first fluid outlet and a second fluid outlet, and a hollow rotor disposed in the hydraulic motor housing so as to rotate about a rotational axis, the rotor including a through opening that is centered on the rotational axis, whereby the rotor provides a gear-free connection to a driven shaft when the driven shaft is disposed in the through opening;
a first manifold portion that is spaced apart from the rotational axis and defines a first portion of a fluid path through the rotary electrohydraulic actuator, the first portion of the fluid path extending between the first fluid inlet and the first fluid outlet, and a second manifold portion that is spaced apart from the rotational axis and defines a second portion of the fluid path, the second portion of the fluid path extending between the second fluid inlet and the second fluid outlet, the first manifold portion connected to the hydraulic motor housing in such a way as to permit the first portion of the fluid path to communicate with the first fluid inlet and the first fluid outlet and the second manifold portion connected to the hydraulic motor housing in such a way as to permit the second portion of the fluid path to communicate with the second fluid inlet and the second fluid outlet;
a hydraulic pump disposed in the fluid path; and
an electric motor that is configured to drive the hydraulic pump,
wherein
the first manifold portion is disposed on a first side of the hydraulic motor, the second manifold portion is disposed on a second side of the hydraulic motor, the first manifold portion is connected to the first fluid inlet of the hydraulic motor on the first side, the second manifold portion is connected to the second fluid inlet of the hydraulic motor on the second side, and the second side is opposed to the first side, and
operation of the electric motor causes the hydraulic pump to supply pressurized fluid to one of the fluid inlet and fluid outlet of the hydraulic motor.

17. A rotary electrohydraulic actuator comprising a hydraulic motor including a hydraulic motor housing having a fluid inlet and a fluid outlet, and a hollow rotor disposed in the hydraulic motor housing so as to rotate about a rotational axis, the rotor including a through opening that is centered on the rotational axis, whereby the rotor provides a gear-free connection to a driven shaft when the driven shaft is disposed in the through opening,
a manifold that defines a portion of a fluid path through the rotary electrohydraulic actuator, the portion extending between the fluid inlet and the fluid outlet, the manifold connected to the hydraulic motor housing in such a way as to permit the fluid path to communicate with the fluid inlet and the fluid outlet and the manifold to be spaced apart from the rotational axis; and a power plant mounted on the hydraulic motor via the manifold, the power plant including:

a first hydraulic pump disposed in the fluid path;

a second hydraulic pump disposed in the fluid path; and an electric motor that includes a rotor having a rotor first end and rotor second end that is opposed to the rotor first end, wherein the first hydraulic pump is connected to the rotor first end so as to be driven by the electric motor, the second hydraulic pump is connected to the rotor second end so as to be driven by a the electric motor, and operation of the electric motor causes the first hydraulic pump and the second hydraulic pump to supply pressurized fluid to one of the fluid inlet and fluid outlet of the hydraulic motor.

\* \* \* \* \*